Figure 1:
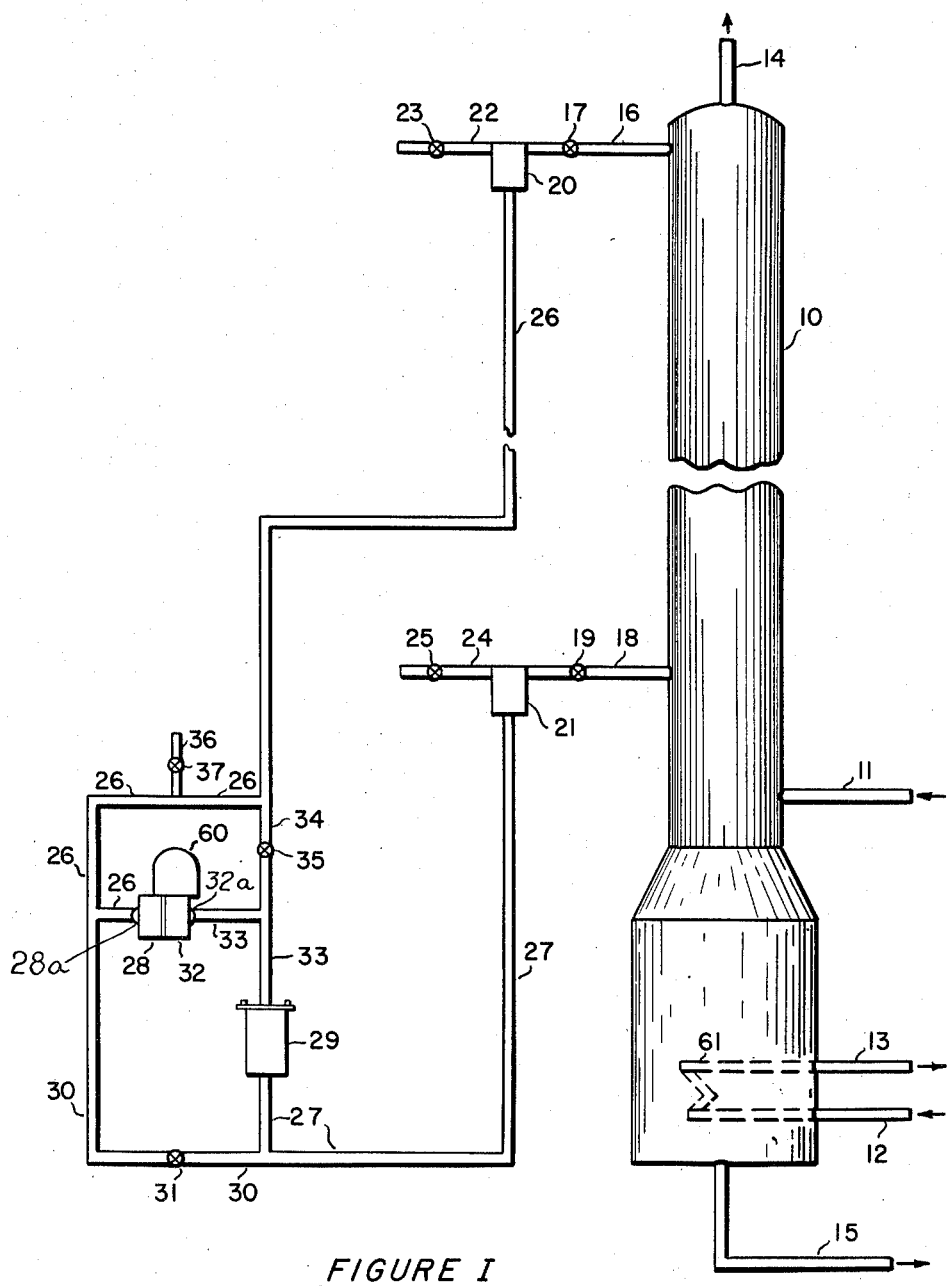

FIGURE I

Feb. 5, 1957 W. H. MAGEARL 2,780,100
DIFFERENTIAL PRESSURE APPARATUS WITH COMPENSATING DEVICE
Filed Sept. 2, 1953 3 Sheets-Sheet 3

William H. Magearl   Inventor
By *[signature]* Attorney

2,780,100

DIFFERENTIAL PRESSURE APPARATUS WITH COMPENSATING DEVICE

William H. Magearl, Baton Rouge, La., assignor to Esso Research and Engineering Company, a corporation of Delaware Application September 2, 1953, Serial No. 378,134

4 Claims. (Cl. 73—389)

This invention relates to improvements in differential pressure measuring apparatus and more particularly relates to a means of compensating for the difference in hydrostatic pressure exerted by liquid in seal legs of different heights leading to a differential pressure measuring instrument.

Previous means of compensating for this difference in height of liquid in the seal legs leading to differential pressure measuring instruments have been complicated and not entirely satisfactory.

The object of the present invention is to provide a simplified means of compensating for this difference in hydrostatic pressure which means automatically compensates regardless of the density of the liquid employed in the seal legs and regardless of the difference in height of the seal legs.

Figure 2:
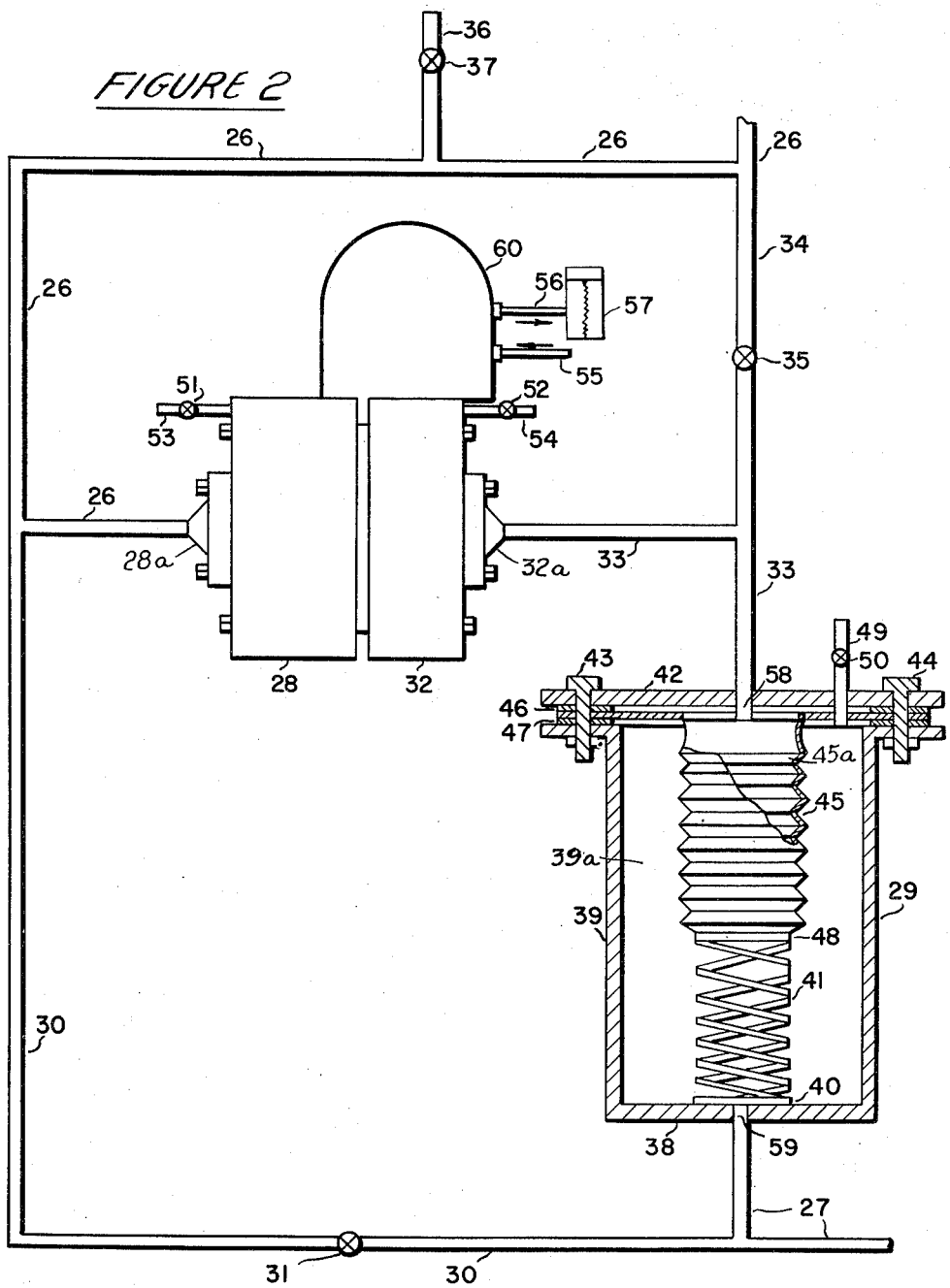
Figure 3:
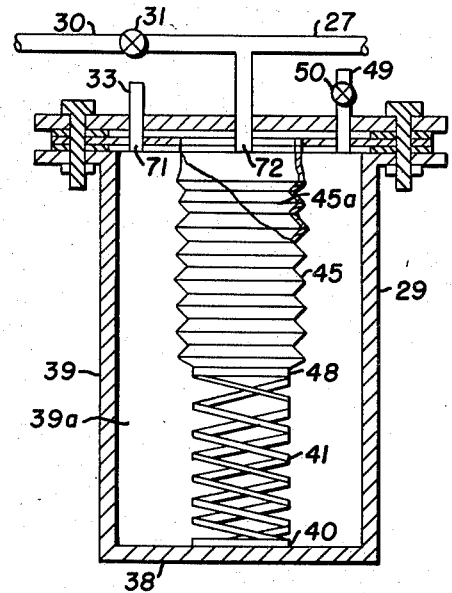

In the drawings:

Fig. 1 represents a diagrammatic view of a tower provided with a differential pressure measuring apparatus which includes a compensating device made according to the present invention;

Fig. 2 represents a detailed diagrammatic showing of the compensating device in combination with a conventional differential pressure measuring instrument with parts broken away to facilitate the disclosure; and Fig. 3 represents a a diagrammatic showing of the compensating device, with parts broken away, and illustrating an alternate arrangement for connection of the device in the system as illustrated by Fig. 2.

One specific form of the present invention is adapted for use in measuring the pressure drop in a fractionating tower. In this form of the invention the fractionating tower is provided with an upper pressure tap and lower pressure tap with a seal leg connecting to each tap. The pressures in the fractionating tower existing at the positions of the pressure taps are transmitted through the seal legs by means of a sealing liquid to a differential pressure measuring apparatus. The difference in pressure existing in the tower between the two pressure taps is measured by a conventional differential pressure measuring instrument in combination with the compensating device made according to the present invention which automatically adjusts for the difference in height of the liquid in the seal legs.

In the fractionation of vapors the measurement of the pressure drop through the tower, or through a part thereof, is an indication of the operating efficiency of the tower. This pressure drop will be a constant when the tower is operating properly. However, when surging, flooding or other upset conditions occur in the tower, variations in the pressure drop will be noted. The present invention may be employed to indicate such fluctuations in pressure drop and thus may be used to control the operation of a fractionating tower. The present invention is especially useful for this type of service as it is able to detect very small changes in pressure drop with a high degree of accuracy in addition to automatically indicating the actual pressure drop in the fractionating tower at all times. Tests may also be conducted with the apparatus of the present invention to determine the pressure drop which will give optimum tower operation.

The present invention is not restricted to fractionating towers and may be utilized, for example, in liquid-liquid contacting towers, or in any other apparatus employing a differential pressure measuring instrument where there is a difference in height of the liquid in the seal legs.

Referring now to Fig. 1, reference character 10 designates a fractionating tower such as one commonly employed for the fractionation of hydrocarbons. Fractionating tower 10 may be of any size for the purpose of the present invention. The height and diameter of fractionating tower 10 will be determined by the capacity, degree of fractionation, etc., required for the desired fractionation operation. A line 11 is provided for introducing a feed stock to the lower portion of tower 10. This feed stock may be preheated prior to its introduction into fractionating tower 10. A line 12 is provided for introducing a heating medium such as steam, heated gas, etc., into a heating means, such as coil 61, in the bottom portion of tower 10, if such heating medium is required, and a line 13 is provided for removing the heating medium from coil 61. The fractionated lighter and lower boiling components of the feed stock are taken overhead as vapors from tower 10 through line 14. The remainder or bottoms of the feed stock is withdrawn from the bottom of tower 10 through line 15. Fractionating tower 10 may also be equipped with other product lines at the sides of the tower. The number of side product lines utilized depend upon the number of products required. Tower 10 is provided with fractionating means (not shown) such as bubble cap trays or packing such as rings, saddles, etc. A lower pressure exists at the top of tower 10 than at the bottom as a pressure drop results from the passage of vapor up tower 10 through the fractionating means.

Tower 10 is provided with a top pressure tap 16 having a valve 17 and a lower pressure tap 18, having a valve 19. These taps communicate with the interior of tower 10. Pressure tap 16 connects to an upper seal pot 20 and pressure tap 18 connects to a lower seal pot 21. Seal pot 20 is provided with a vent line 22 having a valve 23 and seal pot 21 is provided with a vent line 24 having a valve 25. Connecting to the bottom of seal pot 20 is seal leg 26 and connecting to the bottom of seal pot 21 is seal leg 27. Seal pots 20 and 21 act as reservoirs for the sealing fluid and minimize the effect of loss of the sealing liquid by evaporation during an extended period of operation. Because of the larger diameter of the seal pots as compared to the diameter of the seal legs, the variation in level of the sealing liquid due to evaporation, etc., is minimized. This reduces the magnitude of changes in the differential pressure exerted on the differential pressure measuring apparatus by the sealing liquid in the seal legs.

Seal leg 26 communicates with the low pressure side 28 of a conventional differential pressure transmitter 60, such as the Foxboro differential pressure cell described in Foxboro Instrumentation Bulletin 420. The Foxboro differential pressure cell is a pneumatic force balance device for the measurement of flow, liquid level and differential pressure. Pressures are applied to opposite sides of a diaphragm through high and low pressure taps 28a and 32a. The resulting differential pressure is converted into proportional air pressure which is transmitted to remotely located pneumatic receiving instruments such as indicators, recorders or controllers where the actual differential pressure is registered. Instead of using measuring apparatus operating on a pneumatic principle, similar apparatus operating on an electronic principle may be employed.

Seal leg 27 connects to one end of compensating device 29 which is made in accordance with the present invention and which will be presently described in greater detail. Seal leg 26 communicates with seal leg 27 by means of line 30 which includes a valve 31. Line 30 is not essential to the present invention and only serves the purpose of permitting sealing liquid to be introduced at one point in the apparatus to fill both seal legs. The other end of compensating device 29 connects to the high pressure side 32 of differential pressure transmitter 60 through line 33 and tap 32a. Seal leg 26 communicates with line 33 by means of line 34 having valve 35. Communicating with seal leg 26 is line 36 which includes valve 37. Line 36 is an inlet line for introducing sealing liquid to the system when the system is initially placed into operation.

Referring now to Fig. 2, seal leg 27 communicates with the interior of housing 38 of compensating device 29 by means of inlet 59. In this particular form of compensating device 29, housing 38 consists of two parts, namely, reservoir 39 and cover 42. Reservoir 39 is flanged at one end so that it may be bolted to cover 42. Housing 38 is constructed in this manner to facilitate the cleaning and repair of compensating device 29. An expansible and contractible means, or flexible partition, such as bellows 45, is located within housing 38 and is closed at one end and open at the other end. The flexible partition illustrated, divides the receiver or reservoir 39 into two separate receiver chambers, of which the one designated by the numeral 39a is exteriorly of the bellows 45, and the other designated by the numeral 45a is interiorly of the bellows 45. The inlet 59, therefore, communicates with the chamber 39a exteriorly of the bellows 45. Bellows 45 at its open end has an annular flange of approximately the same diameter as cover 42 of housing 38. This annular flange of bellows 45 is arranged between cover 42 and the top of reservoir 39 of housing 38. Gasket 46 is employed between cover 42 and the annular flange of bellows 45 and gasket 47 is employed between reservoir 39 and the annular flange of bellows 45. This assembly is held together by means of bolts 43 and 44. For the purpose of the present invention, cover 42 could be considered as a part of the bellows rather than the housing.

Line 33 communicates with the receiver chamber 45a interiorly of bellows 45 by means of inlet 58 in cover 42 of housing 38. Coil spring 41 which is in coaxial alignment with bellows 45 is arranged between the closed end of bellows 45 and the interior wall of housing 38. Spring 41 is maintained in this position by means, such as rings 40 and 48. A spring other than a coiled spring may be employed in compensating device 29.

Bellows 45 may be made of any flexible material suitable for such service, but is preferably made of a metal such as copper or an alloy containing copper. It is not necessary that bellows 45 offer any resistance when contracted or expanded. Bellows 45 should have a sufficiently large diameter to length ratio to prevent any substantial side motion of the bellows. The size of the bellows selected will determine the dimensions of housing 38 and also the strength of spring 41. The larger the diameter of bellows 45, the greater must be the strength of spring 41. It is essential that the interior of bellows 45 be maintained in fluid tight relationship with the interior of housing 38. The length of bellows 45 must be sufficient to permit expansion of the bellows in housing 38 without exceeding the expansible limit of the bellows. Also spring 41 must be sufficiently strong to permit compression of the spring without exceeding its limit of compressibility.

The chamber 39a communicates with a vent line 49 having a valve 50. Vent line 49 is provided to permit the removal of entrapped air from chamber 39a when the apparatus is initially filled with sealing liquid. The apparatus of the present invention may be permanently installed on a tower or may be mounted on a standard and be portable such that it can be moved from one tower to another.

In preparing the apparatus of the present invention for operation, the following procedure is followed:

First the differential pressure measuring transmitter 60 in combination with compensating device 39 is adjusted to give the correct zero reading. The zero reading is that reading which exists when the pressures on the opposite sides of the diaphragm (not shown) of differential pressure transmitter 60 are equal. With fractionating tower 10 in operation, valves 17 and 19 are closed initially in order to isolate the differential pressure measuring apparatus from the pressures in fractionating tower 10. All other valves are in the open position and the seal legs and lines contain only atmospheric air. Under these conditions the pressures on opposite sides of the diaphragm of differential pressure transmitter 60 are equal. Instrument air is introduced to the differential transmitter 60 through inlet line 55. This instrument air is at a pressure of approximately 17 to 20 lbs./sq. in. gauge. The zero adjusting screw (not shown) of the differential pressure transmitter 60 is adjusted to produce an air pressure of 3 p. s. i. g. in the outlet air line 56 which connects to a pneumatic receiver recorder indicated by reference character 57. An indicator or controller may be substituted for recorder 57. The range required of recorder 57 is determined by the magnitude of the maximum differential pressure which will exist in fractionating tower 10. A recorder is selected which will include this maximum differential pressure. When the air in outlet air line 56 is at a pressure of 3 p. s. i. g., recorder 57 will register zero pressure differential. The differential pressure apparatus will now give a correct reading for zero differential pressure.

With valves 23, 25, 37, 35, 31, 50 and valves 51 and 52 in vent lines 53 and 54, respectively, of the differential pressure transmitter 60 open, sealing liquid is introduced to the system through line 36. In the case of hydrocarbon fractionation the sealing liquid may be water or water containing an anti-freeze solution for cold weather operation below 32° F. such as ethylene glycol or glycerine. It is necessary to employ a sealing liquid which is (1) immiscible with the stock being fractionated, and (2) of higher density than the heaviest component being fractionated. When the level of the sealing liquid in the system rises to the top of compensating device 29, valve 50 in vent line 49 is closed; when the liquid level rises to the top of differential pressure transmitter 60, valves 51 and 52 in vent lines 53 and 54, respectively, are closed; when the sealing liquid fills seal pot 21, valve 25 in vent line 24 is closed; and when the sealing liquid fills seal pot 20, valve 37 is closed to discontinue the flow of sealing liquid to the system. Valve 23 in vent line 22 remains in the open position. Then valve 31 is closed to isolate the pressure system connected to tap 16 of tower 10 from the pressure system connected to tap 18 of tower 10, and then valve 25 is opened. The pressures on opposite sides of the differential pressure transmitter 60 are equal under these conditions as each side is acted upon by the same head of liquid, namely the height of the sealing liquid in seal pot 20. If desired, the adjustment of the differential pressure measuring apparatus to give a correct zero reading could be made at this time rather than prior to the introduction of sealing liquid to the system. It will be noted that spring 41 is compressed by a pressure equivalent to the difference in hydrostatic pressure exerted by the sealing liquid in seal legs 26 and 27. The hydrostatic pressure in the chamber 39a exteriorly of the bellows 45, due to the liquid in seal leg 27, tends to compress bellows 45 but this pressure is more than offset by the hydrostatic pressure in the chamber 45a interiorly of bellows 45 due to the liquid in seal leg 26 and the lines 33 and 34, which pressure expands bellows 45 and compresses spring 41. Valve 35 is now closed. The pressures on opposite sides of the transmitter remain equal after valve 35 is closed. Also the pressure in air outlet line 56 remains at 3 p. s. i. g. and the reading of recorder 57 remains at zero. In addition, the extent of compression of spring 41 remains the same as before valve 35 was closed. Thus spring 41 of compensating device 29 compensates for the difference in hydrostatic pressure exerted by the liquid in the seal legs.

The next step in the procedure is to adjust the differential pressure measuring apparatus to give a correct full scale reading. Air under pressure is introduced into line 24 by using an air regulator and air pressure gauge. The air pressure is regulated, as indicated by the air pressure gauge, to produce a pressure exactly equal to the full scale reading of differential pressure recorder 57. A recorder having the smallest range or full scale reading which will include the maximum differential pressure which will exist in fractionating tower 10 is preferable as such a recorder will be most sensitive to small fluctuations in differential pressure. The air pressure introduced into line 24 is transmitted by means of line 24, seal pot 21, seal leg 27, compensating device 29 and line 33 to the high pressure side 32 of the differential pressure transmitter 60. The differential pressure transmitter 60 is adjusted by means of a range adjustment mechanism (not shown) to produce a pressure of 15 p. s. i. g. in air outlet line 56 leading to differential pressure recorder 57. The recorder 57 will show a full scale reading when the air pressure in line 56 is 15 p. s. i. g. Recorders, such as recorder 57, are available commercially and are designed to give a zero reading with 3 p. s. i. g. pressure in the air outlet line 56 leading to the recorder and a full scale reading with 15 p. s. i. g. pressure in the air outlet line 56. The supply of air to line 24 is now disconnected. The reading of recorder 57 returns to zero as the pressures on opposite sides of differential pressure transmitter 60 are equal. The pressure on low pressure side 28 of differential pressure transmitter 60 is equivalent to the height of sealing liquid in seal leg 26; the pressure on high pressure side 32 of differential transmitter 60 is equivalent to the height of sealing liquid in seal leg 27 plus the compressed force of spring 41 which is equivalent to the difference in height of sealing liquid in the two seal legs.

Now that the system has been filled with sealing liquid and the differential pressure measuring apparatus has been adjusted to give correct readings at the zero and full scale positions, the system can be utilized to measure the pressure drop in tower 10 which exists between upper pressure tap 16 and lower pressure tap 18. Valves 23 and 25 are closed and valves 17 and 19 are opened. The true pressure drop in the tower between the level of lines 16 and 18 will now be registered on the chart on differential pressure recorder 57. The difference in hydrostatic pressure exerted by the liquid in seal legs 26 and 27 is counterbalanced by the force exerted by spring 41 of compensating device 29.

The present invention was employed to measure the pressure drop in a debutanizer tower in which a naphtha hydrocarbon stream is fractionated to produce an overhead stream of butanes and lighter hydrocarbons. The debutanizer tower is approximately 85' high and 9'6" in diameter. About 17,600 barrels per day of naphtha are fed to the tower and heated to about 215° F. to fractionate overhead as vapor approximately 11,000 liquid barrels per day of butanes and lighter material. The debutanizer tower contains 30 plates and operates under a pressure of about 225 p. s. i. g. A pressure drop or differential pressure of approximately 4 p. s. i. was continuously measured across a portion of the tower in accordance with the present invention.

The difference in height between the upper pressure tap and the lower pressure tap to the debutanizer tower amounted to 75 feet, and the seal legs leading from these pressure taps to the differential pressure measuring apparatus and other lines of the apparatus were filled with a sealing liquid comprising water and ethylene glycol, the latter serving as an anti-freeze agent. The compensating device made in accordance with the present invention was employed in combination with a Foxboro differential pressure cell and a recorder having a full scale reading, or range, of 10 p. s. i. Housing 38 of the compensating device was made of 6" standard pipe and was 9" high. Inlets 58 and 59 were adapted to connect to ¼" standard pipe and vent line 49 was made of ¼" standard pipe. Bellows 45 was constructed of bronze and had a diameter of 5" and a fully expanded length also of 5". Spring 41 had a normal length of 5" and a diameter of 3" and was capable of resisting a force of 1000 pounds without exceeding its compressible limit. Since the difference in hydrostatic pressure exerted by the liquid in the two seal legs amounted to approximately 30 p. s. i. it would have been impossible to measure the differential pressure of approximately 4 p. s. i. in the debutanizer tower without employing compensating device 29.

Variations may be made in the present invention without departing from the spirit thereof. For example, spring 41 could be placed within bellows 45 and fixed at one end to the closed end of bellows 45 and fixed at the other end to cover 42 of housing 38. In this case in operation of the apparatus spring 41 would be in tension. Also, suitable operation of the system would be obtained by reversing seal leg 27 and line 33. This arrangement is illustrated in Fig. 3 wherein the line 33 communicates with the chamber 39a exteriorly of the bellows 45 as by way of an inlet 71, and seal leg 27 communicates with the chamber 45a interiorly of the bellows 45 by way of an inlet connection 72. In this case in operation of the apparatus coil spring 41 would be in tension instead of compression. Another modification would be to place the coil spring 41 inside bellows 45 when line 33 and seal leg 27 are connected to the housing 38 in the manner shown by Fig. 3. In this case coil spring 41 would be in compression. In addition, compensating device 29 may be oriented in any position. However, the position as shown is preferred because housing 38 may be easily vented by means of vent line 49.

Compensating device 29 may also be employed in another useful form to measure small variations in pressure when the actual working pressure of a vessel is large. In this case the low pressure side 28 of differential pressure transmitter 60 is connected to a short conduit (not shown) leading to compensating device 29, and the high pressure side of differential transmitter 60 is connected by means of a seal leg to the vessel whose pressure is to be measured. The aforementioned conduit communicates with the interior of bellows 45 of compensating device 29 by means of inlet 58 of housing 38. Inlet 59 of housing 38 is left open to the atmosphere so that the pressure in the interior of housing 38 is equal to atmospheric pressure. A fluid, preferably a liquid, under pressure is introduced into the conduit which connects the low pressure side 28 of differential pressure transmitter 60 with the interior of bellows 45 until a pressure of 85 to 95% of the working pressure in the vessel is obtained in this part of the apparatus. The introduction of fluid into this part of the system is then discontinued and the system is closed off to seal in the pressure of the liquid. In this way a recorder having a relatively low pressure range may be employed rather than one having a large pressure range which would be required if measuring the full working pressure. Thus small variations in pressure can be measured with a high degree of accuracy when employing compensating device 29 in this specific form due to the low range of pressures involved.

The present invention may be employed on towers of any height and with any pressure drop throughout the tower. In extreme cases it may be necessary to substitute a stronger coil spring in the place of the one used in the normal operation of compensating device 29.

Also, the present invention will automatically compensate for the difference in hydrostatic pressure exerted by liquid of any density of the seal legs. It would thus be possible to use two different sealing liquids if the operating conditions required such a situation, i. e. one sealing liquid could be used in seal leg 26 and another in seal leg 27 by providing an additional inlet for the second sealing liquid in order to maintain the two different sealing liquids separately. The present invention in this case would compensate for the difference in hydrostatic pressure exerted by the liquids in the two seal legs.

What is claimed is:

1. The combination with pressure responsive means adapted to produce an output representative of the difference between a pair of unlike pressures applied thereto, said means having a pair of pressure taps adapted to apply said pressures to said pressure responsive means of a device for transmitting said pressure to said taps, said device comprising a conduit system adapted to contain sealing and pressure transmission liquids confined in said system, wherein said system includes two substantially vertical leg portions of unequal vertical length, each having upper and lower ends of which the upper end of the longer leg portion is adapted to be connected to one of said pressures, and the upper end of the shorter leg portion is adapted to be connected to the other of said pressures, means to maintain unequal heads of liquid in said leg portions and to balance the hydrostatic differential pressure therebetween, including an enclosed liquid receiver in said conduit system and a flexible partition in said receiver separating the receiver into a pair of chambers, a first direct conduit connection between the lower end of one of said leg portions and one of said taps of said pressure responsive means, said tap being adapted to receive a pressure corresponding in value to the pressure with which said leg portion is connected at its upper end, a second direct conduit connection between the lower end of the other leg portion and one of said liquid receiver chambers, a third direct conduit connection between the other of said liquid receiver chambers and the other of said taps of said pressure responsive means, a fourth conduit connection between said first conduit connection and said third conduit connection, said fourth conduit connection including a valved closure for said fourth conduit connection, and a spring means engaged between said reservoir partition and a wall of said reservoir, which spring means is adapted and disposed to exert a force against said partition which is substantially equal and opposed to the force exerted on the partition by the difference between hydrostatic heads of sealing and pressure transmission liquid in the said leg portions.

2. A device according to claim 1 wherein said flexible partition is a bellows disposed within said receiver, said bellows having a closed end and an open end secured in fluid tight relation to said receiver, whereby one of said receiver chambers is interiorly and the other receiver chamber is exteriorly of said bellows, wherein said second conduit connection is between the lower end of said other leg portion and the chamber exteriorly of said bellows and wherein said spring means is engaged between said reservoir wall and said bellows closed end.

3. A device according to claim 1 wherein said flexible partition is a bellows disposed within said receiver, said bellows having a closed end and an open end secured in fluid tight relation to said receiver, whereby one of said receiver chambers is exteriorly and the other receiver chamber interiorly of said bellows, wherein said second conduit connection is between the lower end of said other leg portion and the chamber interiorly of said bellows and wherein said spring means is engaged between said reservoir wall and said bellows closed end.

4. A device according to claim 1, wherein said first conduit connection is between the lower end of said longer leg portion and said one tap of said pressure responsive means.

References Cited in the file of this patent

UNITED STATES PATENTS

| 2,466,071 | Barnes et al. | Apr. 5, 1949 |
| 2,520,547 | Hughes | Aug. 29, 1950 |
| 2,528,883 | Hayward | Nov. 7, 1950 |
| 2,612,044 | De Mart | Sept. 30, 1952 |

FOREIGN PATENTS

| 24,426 | Great Britain | Oct. 27, 1913 |
| 448,357 | Germany | Aug. 16, 1927 |
| 481,986 | Germany | Sept. 5, 1929 |